United States Patent
Ludemann et al.

(10) Patent No.: US 12,111,485 B2
(45) Date of Patent: Oct. 8, 2024

(54) TEXTURED COATING FOR OPTICAL PRODUCTS

(71) Applicant: 3M INNOVATIVE PROPERTIES COMPANY, St. Paul, MN (US)

(72) Inventors: Thomas J. Ludemann, Maplewood, MN (US); Jeffrey W. Hagen, Woodbury, MN (US); David T. Ask, Somerset, WI (US); Kristy A Gillette, Spring Valley, WI (US); Eric D. Shockey, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 685 days.

(21) Appl. No.: 17/332,477

(22) Filed: May 27, 2021

(65) Prior Publication Data

US 2021/0302628 A1    Sep. 30, 2021

Related U.S. Application Data

(62) Division of application No. 15/306,756, filed as application No. PCT/US2015/026875 on Apr. 21, 2015, now abandoned.

(Continued)

(51) Int. Cl.
*G02B 5/02* (2006.01)
*B05D 1/28* (2006.01)
(Continued)

(52) U.S. Cl.
CPC ............. *G02B 5/0268* (2013.01); *B05D 1/28* (2013.01); *B05D 1/305* (2013.01); *G02B 1/10* (2013.01);
(Continued)

(58) Field of Classification Search
CPC ... G02B 5/0221; G02B 5/0268; G02B 5/0278
See application file for complete search history.

(56) References Cited

U.S. PATENT DOCUMENTS 6,573,958 B2   6/2003   Takahashi et al.
6,719,426 B2   4/2004   Magarill
(Continued)

FOREIGN PATENT DOCUMENTS

JP   11-199798   7/1999
JP   2000-239535   9/2000
(Continued)

OTHER PUBLICATIONS

International Search Report for PCT International Application No. PCT/US2015/026875, mailed on Jan. 18, 2016, 4 pages.
(Continued)

*Primary Examiner* — Ryan D Howard
(74) *Attorney, Agent, or Firm* — Philip P. Soo

(57) ABSTRACT

A coating composition includes a first polymer and a second polymer that are incompatible and non-reactive with one another. The absolute value of the difference between the refractive index of the first polymer and the refractive index of the second polymer is about 0 to about 0.01. The first polymer and the second polymer are soluble in a carrier liquid that is a good solvent for the first polymer and a poor solvent for the second polymer. The carrier liquid is removed from the coating layer to spinodally decompose the mixture of the first polymer and the second polymer in an amount sufficient to form a substantially continuous first phase with a predominant amount of the first polymer and a substantially discontinuous second phase with a predominant amount the second polymer. At least 70% of the second
(Continued)

50.00 μm phase includes droplets with an aspect ratio, when viewed in the plane of the surface of the substrate, of less than about 3.

14 Claims, 7 Drawing Sheets

Related U.S. Application Data

(60) Provisional application No. 61/984,451, filed on Apr. 25, 2014.

(51) Int. Cl.
  *B05D 1/30* (2006.01)
  *G02B 1/10* (2015.01)
  *G02B 27/00* (2006.01)

(52) U.S. Cl.
  CPC ........... *G02B 5/021* (2013.01); *G02B 5/0221* (2013.01); *G02B 5/0278* (2013.01); *G02B 27/0025* (2013.01)

(56) References Cited

U.S. PATENT DOCUMENTS

| | | | |
|---|---|---|---|
| 7,351,470 | B2 | 4/2008 | Draheim |
| 7,820,236 | B2 | 10/2010 | Pokorny |
| 8,608,363 | B2 | 12/2013 | Weber |
| 8,662,687 | B2 | 3/2014 | Weber |
| 8,917,448 | B2 | 12/2014 | Weber |
| 8,988,776 | B2 | 3/2015 | Weber |
| 2008/0064115 | A1 | 3/2008 | Hiramatsu |
| 2008/0064133 | A1 | 3/2008 | Lee |
| 2010/0315715 | A1 | 12/2010 | Oki |
| 2011/0222263 | A1 | 9/2011 | Weber |

FOREIGN PATENT DOCUMENTS

| | | | |
|---|---|---|---|
| JP | 2004-358796 | | 12/2004 |
| JP | 2005-070435 | | 3/2005 |
| JP | 2005-195819 | | 7/2005 |
| JP | 2006-161011 | | 6/2006 |
| JP | 2008-225195 | | 9/2008 |
| JP | 2008-299007 | | 12/2008 |
| JP | 2013-065421 | | 4/2013 |
| JP | 2013-097220 | | 5/2013 |
| JP | 2013097220 A | * | 5/2013 |
| WO | WO 2005/073763 | | 8/2005 |
| WO | WO 2008-144644 | | 11/2008 |
| WO | WO 2013-096324 | | 5/2013 |

OTHER PUBLICATIONS

Examination Report from the Intellectual Property Office of Singapore for Application No. 11201608892P, date of the Examination Report, Apr. 20, 2018, 3 pages.
Written Opinion from the Intellectual Property Office of Singapore for Application No. 11201608892P, date of the Written Opinion, Sep. 19, 2017, 4 pages.

* cited by examiner

TEXTURED COATING FOR OPTICAL PRODUCTS

CROSS REFERENCE TO RELATED APPLICATIONS

This application is a divisional of U.S. application Ser. No. 15/306,756, filed Oct. 25, 2016, now pending, which is a 371 of PCT Application No. PCT/US2015/026875, filed Apr. 21, 2015, U.S. Provisional Application No. 61/984,451, filed Apr. 25, 2014, the disclosures of which are incorporated by reference in their entirety herein.

BACKGROUND

Optical displays in devices such as mobile telephones, personal digital assistants (PDAs), liquid crystal display (LCD) panels, televisions, computers, and the like can have screens or lens elements made from a substrate such as, for example, glass or a polymeric film. In some optical displays the substrate has applied thereon a coating to create a matte appearance that scatters light emitted by a backlight underlying the substrate and can hide defects in the display materials. In some optical displays, the matte coating is formed by the use of polymeric beads or inorganic oxide particles, and/or structured surfaces. Particle settling and agglomeration in the coating fluids can make these coatings difficult to manufacture with consistent and reproducible quality.

SUMMARY

It can be difficult to apply a coating composition with bead-like particles to a substrate and form a uniform coating with good and consistent optical quality. The bead-like particles can settle out of the coating composition over time or agglomerate. The beads can deform as they are applied to a substrate during a coating process, or can scratch or otherwise mar the substrate. The uneven distribution of the bead-like particles in the coating composition can cause non-uniform surface tension or stretching during the coating process, which can produce a coating with streaks, lumps, and uneven thickness. These irregularities degrade optical quality, which can create variations in the brightness of a display, cause excessive glare for a display user, or result in undesirable patterns that interfere with the user interface or the user experience.

In one aspect, the present disclosure is directed to a method including:
  coating a surface of a substrate with a coating composition to form a coating layer thereon, wherein the coating composition includes:
    a first polymer and a second polymer, wherein the first polymer and the second polymer are incompatible and non-reactive with one another, and wherein the absolute value of the difference between the refractive index of the first polymer and the refractive index of the second polymer is about 0 to about 0.01, and
    a carrier liquid, wherein the first polymer and the second polymer are soluble in the carrier liquid, and wherein the carrier liquid is a good solvent for the first polymer and a poor solvent for the second polymer; and
  removing the carrier liquid from the coating layer to spinodally decompose the mixture of the first polymer and the second polymer, wherein the carrier liquid is removed in an amount sufficient to form a substantially continuous first phase comprising a predominant amount of the first polymer and a substantially discontinuous second phase comprising a predominant amount the second polymer, wherein at least 70% of the second phase includes droplets with an aspect ratio, when viewed in the plane of the surface of the substrate, of less than about 3.

In another aspect, the present disclosure is directed to an optical element including:
  a light transmissive substrate; and
  a continuous coating on the substrate, wherein the coating includes:
    a first region including a first polymer selected from cellulose resins and (meth)acrylic resins; and
    a second region including a second polymer different from the first polymer, wherein the second polymer is selected from cellulose resins and (meth)acrylic resins; wherein the first polymer and the second polymer are incompatible and non-reactive with one another, and wherein the absolute value of the difference between the refractive index of the first polymer and the refractive index of the second polymer is about 0 to about 0.01, and wherein the first regions have a thickness different from the second regions.

The coating described in the present disclosure does not include beads, and can reduce scratching of adjacent optical surfaces or structures. The coating of this disclosure can be used on any light transmissive substrate to eliminate or reduce the appearance of at least one of pixel or reflective Moiré, prism or substrate color mura (irregularity or unevenness), or interference patterns such as Newton's Rings. In various embodiments, the coatings have low graininess and small feature size, and provide a wide and smooth viewing and brightness viewing angle. In various embodiments, the coatings can subdue sparkle or dazzle, hide defects, and are sufficiently tough and resilient to reduce or eliminate imprinting caused by contact with adjacent optical surfaces or structures.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like symbols in the drawings indicate like elements.

DETAILED DESCRIPTION

Figure 1:
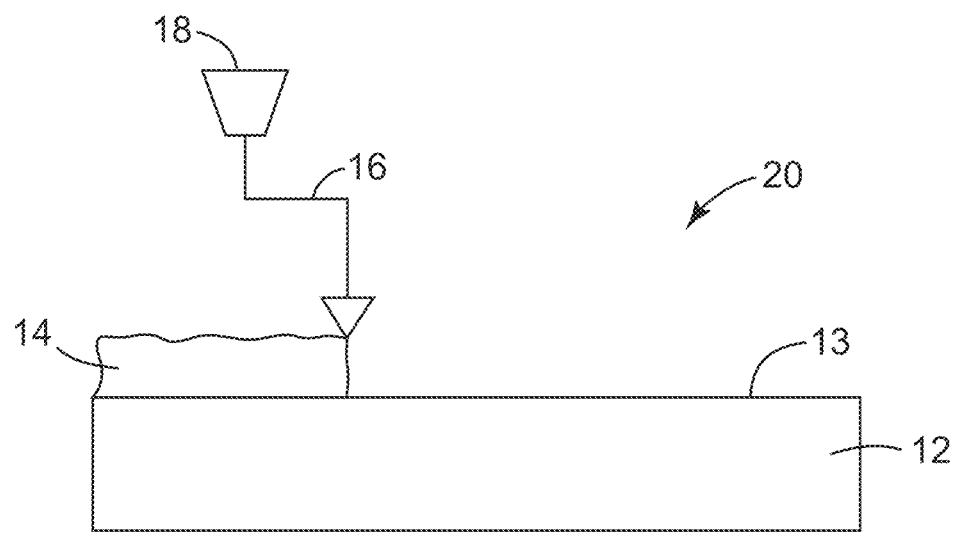
FIG. 1 is a schematic cross-sectional view of a process for forming a coating layer.

FIG. 1 is a schematic view of an illustrative process 20 for forming a coating layer 14 on a surface 13 of a transparent substrate 12. The substrate 12 can be coated with a flowable coating composition via a coating apparatus 16, forming a coating layer of the coating composition on the substrate. Suitable coating apparatus 16 include, but are not limited to, slot die coaters, slide coaters, fluid bearing coaters, roll-type coaters, gravure coaters, and curtain coaters, and the like. At least a portion of a carrier liquid present in the coating layer 14 can be removed via, for example, evaporation to form a coating on the substrate 12.

Suitable substrate materials 12 include glass as well as thermosetting or thermoplastic polymers such as polycarbonates, poly(meth)acrylates (e.g., polymethyl methacrylate (PMMA), polyolefins (e.g., polypropylene (PP)), polyurethanes, polyesters (e.g., polyethylene terephthalate (PET)), polyamides, polyimides, phenolic resins, cellulose diacetate, cellulose triacetate, polystyrene, styrene-acrylonitrile copolymers, epoxies, multilayered films made from layers of different polymeric materials, and the like. The substrate 12 can be chosen based in part on the desired optical and mechanical properties for the intended use. Such mechanical properties can include flexibility, dimensional stability and impact resistance. The substrate thickness can also depend on the intended use, and suitable thicknesses can be less than 0.5 mm, or from 0.015 mm to about 0.2 mm.

Self-supporting polymeric films are useful for the substrate 12. In some embodiments, the substrate is made from polyesters such as PET or polyolefins such as PP (polypropylene), PE (polyethylene) and PVC (polyvinyl chloride). In some embodiments, the substrate is a multilayer polymeric film formed of alternating layers of different polymer materials having differing refractive indices, some of which may be birefringent. The polymeric material can be formed into a substrate film using conventional filmmaking techniques such as by extrusion and optionally uniaxial or biaxial orientation of the extruded film. The substrate can be treated to improve adhesion between the substrate and the hardcoat layer, e.g., chemical treatment, corona treatment, plasma, flame, or actinic radiation. If desired, an optional tie layer or primer can be applied to the substrate and/or hardcoat layer to increase the interlayer adhesion. In the case of articles such as display panels and protective articles, the substrate is light transmissive, meaning light can be transmitted through the substrate such that the display can be viewed. Both transparent (e.g., gloss) and matte light transmissive substrates are employed in display panels.

A coating composition 18 loaded into the coating apparatus 16, and when applied to the surface 13 becomes the coating layer 14. The coating composition 18 includes two or more polymers and a carrier liquid. The term "polymer" in this application will be understood to include polymers, copolymers (e.g., polymers formed using two or more different monomers), oligomers and combinations thereof, as well as polymers, oligomers, or copolymers that can be formed in a miscible blend by, for example, coextrusion or reaction, including transesterification. Both block and random copolymers are included, unless indicated otherwise. The term "polymer" in some contexts may also be inclusive of polymer precursors such as monomers that are capable of being polymerized or cross-linked.

In one embodiment, the coating composition includes a first polymer and a second polymer. The first polymer and the second polymer are incompatible, which in this application means that the polymers, when blended or mixed with one another, form separated phases. The first polymer and the second polymer are also phase separable from one another by liquid spinodal decomposition from the carrier liquid. When the first and the second polymers are more compatible with one another, they may fail to phase separate from one another as the carrier liquid is removed from the coating composition. The first polymer and the second polymer also do not chemically react with one another when incorporated together into the carrier liquid at the temperatures used in the processes for coating and drying the coating layer 14. During the coating and drying processes that form the coating layer 14, the first polymer and the second polymer mix, but do not undergo chemical reactions that can irreversibly break chemical bonds or cause chemical changes.

The first polymer and the second polymer each have a refractive index that is as similar to that of the other as possible. The term "refractive index" is defined herein as the absolute refractive index of a material which is understood to be the ratio of the speed of electromagnetic radiation in free space to the speed of the radiation in that material. The refractive index can be measured using known methods and is generally measured using an Abbe Refractometer in the visible light region. In various embodiments, the absolute value of the difference between the refractive index of the first polymer and the refractive index of the second polymer is about 0 to about 0.01, about 0 to about 0.005, or about 0 to about 0.002.

In various embodiments, the first and the second polymers can be selected to have a glass transition temperature (Tg) appropriate for a particular application. For example, in some embodiments, the Tg of each of the first and the second polymers is greater than about 100° C., which can provide a coating for an optical element that has toughness and is resistant to causing imprinting or chemical leaching onto an adjacent film. In other embodiments in which the optical element is to be used in an electronic device very near a LED light strip, polymers with a Tg greater than 80° C. can be used, or the polymers can have a Tg greater than about 50° C. if the optical element is a greater distance from the LED light source. If the optical element is to be used on an exterior surface of a device, a Tg of greater than about 37° C. can be suitable, or if the coating is used in ambient conditions, a Tg of greater than about 25° C. will likely suffice.

In various embodiments, the first and the second polymers can be selected from acrylic resins, acetyl resins, vinyl resins, polyethylene resins, polystyrene resins, polypropylene resins, polyamide resins, polyimide resins, melamine resins, phenolic resins, silicone resins, cellulose resins, polyester resins, polysulfone resins, polyvinyl butyral resins and cyclic polyolefin resins. In some embodiments, both the first polymer and the second polymer are a cellulose resin. In some embodiments, the cellulose resins include, but are not limited to, cellulose acetate (CA), cellulose acetate butyrate (CAB), and cellulose acetate propionate (CAP).

The amount of each of the first polymer and the second polymer in the coating composition can be varied over a wide range to control properties of the coating 14 such as, for example, any or all of haze, clarity, surface texture, or resistance to imprinting of an adjacent film. The ratio by weight of the first polymer to the second polymer in the coating composition may vary widely depending on the intended application of the coating layer 14, and in various embodiments may be selected within the range of about 5/95 to 95/5, or 95/5 to 40/60, or 90/10 to 50/50, or from 90/10 to 60/40. In some non-limiting embodiments intended to serve as an example, if the first and the second polymers are cellulose resins, the ratio by weight of the first polymer to the second polymer can be from about 1:2 to about 10:1, or about 2:1 to about 1:2, or about 1:1 to about 9:1. For example, in various embodiments, the coating composition can include at least 35 wt % CAB, or at least 50 wt % CAB, or up to 90 wt % CAB.

In some embodiments, the coating composition optionally includes a third polymer that is compatible and non-reactive with at least one of the first and the second polymers. There may be various reasons for incorporating a third polymer. One exemplary reason for incorporating a third polymer is to improve cohesion. In various embodiments, the third polymer includes acrylic resins, and may include acrylic polymers or copolymers. Suitable acrylic polymers and copolymers include, but are not limited to poly(meth)acrylates such as poly methyl acrylate and poly methyl methacrylate. In various non-limiting embodiments, the (meth) acrylates have been found to provide a coating that is resistant to delamination.

The coating composition further includes a carrier liquid that can be a single solvent or include two or more solvents. The term "solvent" in this application refers to a substance that is capable of at least partially dissolving at least one of the first and the second polymers to form a solution or dispersion. A "solvent" may be a mixture of one or more substances. The carrier liquid dissolves both the first and the second polymers of the coating composition, but upon evaporation, the first and the second polymers precipitate out of solution such that there is at least partial phase separation to form a first phase including a predominant amount of the first polymer and a second phase including a predominant amount of the second polymer.

In one embodiment, the carrier liquid includes a good solvent for one of the first and the second polymers, and a poor solvent for one of the first and the second polymers. A "good solvent" dissolves the polymer over a broad concentration range, and the polymer does not precipitate immediately from the good solvent upon the commencement of drying down of the coating layer (i.e., upon evaporation of the solvent). In contrast, a "poor solvent" may dissolve the polymer, although it would be over a limited concentration range, and the polymer precipitates readily from the poor solvent upon commencement of removal of the solvent (dry down). That is, as the carrier liquid evaporates, the coating composition becomes enriched in a poor solvent for one of the first and the second polymers and that polymer phase separates from the other polymer (i.e., precipitates), rather than remaining homogeneously blended and forming an absolute smooth film.

The coating composition may need to be heated slightly to ensure that the first and the second polymers remain in solution in the carrier liquid until after the coating composition is coated out on the surface of the substrate. The coating should be sufficiently stable and adherent to the surface of the substrate such that cracks do not form either during or after coating, thereby forming a substantially uniformly distributed coating over the surface of the substrate.

The prediction of solubility of various solutes (e.g., polymer) in various solvents (e.g., good or poor solvents) has been that "like dissolves like." For example, a polymer that is polar or includes polar functional groups will be soluble in a polar solvent and not as soluble in a non-polar solvent. A more universal approach was developed by Hildebrand, who assumed that the mutual solubility of components depends on the cohesive pressure, c. The square root of the cohesive pressure is Hildebrand's solubility parameter, $\delta$.

As defined herein, a "good solvent" has a Hildebrand solubility parameter value that differs from the solute polymer Hildebrand solubility parameter value by less than 2. As defined herein, a "poor solvent" has a Hildebrand solubility parameter value that differs from the solute polymer Hildebrand solubility parameter value by 2 or greater, or 3 or greater, or 4 or greater, or from 2 to 8, or from 2 to 6, or from 2 to 5, or from 2 to 4, or from 2 to 3, or from 3 to 4.

In another embodiment, the carrier liquid includes a mixture or blend of good and poor solvents for the first and the second polymers. The carrier liquid includes at least one good solvent for the first polymer and at least one poor solvent for the second polymer. For example, in some embodiments a polar solvent can be used for the good solvent, and a non-polar solvent can be used as the poor solvent. In various embodiments, the good solvent can be present in the coating composition in any useful amount, and the poor solvent can be present in amount less than the good solvent.

The poor solvent can have a boiling point that is greater than the good solvent. In various embodiments, the poor solvent boiling point can be greater than the good solvent boiling point by a value in the range of 25° C. or greater, or 35° C. or greater, or 50° C. or greater, or from 25 to 100° C.

In various embodiments, the carrier liquid can include one of more solvents such as, for example, water, methanol, ethanol, isopropyl alcohol, acetone, glycol ethers, methyl ethyl ketone (MEK), cyclohexanone, ethyl acetate, isopropyl acetate, n-butyl acetate, and toluene. In some embodiments, the carrier liquid includes a mixture of a glycol ether and methyl ethyl ketone (MEK).

The concentration of the polymers and additives in the carrier liquid can vary over a wide range, as long as phase separation, castability, and coatability can be maintained, and is, for example, about 1 wt % to about 30 wt %, or about 5 wt % to about 20 wt %, or about 5 wt % to about 10 wt %. The dried thickness of the coating layer ultimately can have an impact on the clarity and haze of the coating.

The coating composition can further optionally include other organic or inorganic additives, such as, for example, antioxidants, stabilizers, antiozonants, plasticizers, dyes, U.V. absorbers, hindered amine light stabilizers (HALS), surfactants, antistats, crosslinkers, nanoparticles, and pigments. In various embodiments, the additives are present in the coating composition at less than about 10 wt %, or less than about 5 wt %, or less than about 1 wt %.

Referring again to FIG. 1, after the coating composition 18 is applied on the surface 13 of the substrate 12 to form the coating layer 14, the carrier liquid is gradually removed from the coating layer 14. The carrier liquid can be removed from the coating layer 14 by evaporation to dry down the coating layer and form a coating on the substrate. Both density and surface tension in the coating layer change as the coating layer dries, since both properties are a function of temperature and change in composition. Evaporation of the volatile materials in the carrier liquid leads to a temperature gradient and a volatility gradient through the coating layer. As the carrier liquid is gradually removed, wet spinodal decomposition occurs, thermodynamic equilibrium begins to favor coexistence of two phases, and a phase-separated structure forms on the surface 13 of the substrate 12.

As removal of the carrier liquid continues, the phase separated structure includes a first phase with a predominant amount of the first polymer and small amount of the second polymer, and a second phase including a predominant amount of the second polymer and a small amount of the first polymer. One of the first and second phases, referred to herein for clarity as the first phase, is substantially continuous over the surface of the substrate, and the other of the first and second phases, referred to herein for clarity as the second phase, coalesces to form a discontinuous arrangement of regularly or irregularly shaped liquid regions that exists with the first phase. Depending on, for example, factors such as the ratio of the first polymer to the second polymer in the coating composition, the selection of solvents in the carrier liquid, and the drying conditions selected for the evaporation of the carrier liquid, the second phase can coalesce into liquid regions resembling droplets, or may coalesce into liquid regions that resemble rivulets. The second phase may be present atop the first continuous phase, or may occupy areas of the substrate surface distinct from the areas occupied by the first phase. The phase-separated structure creates an uneven coating structure on the surface of the substrate after the carrier liquid is dried. The uneven surface structure formed by the phase-separated polymeric resin components has a gentle roughness that in some embodiments is more regular compared to coatings with particles embedded in a resin. Since the coating of the present disclosure does not include particles, in some embodiments it is tougher and more abrasion resistant, as there is less opportunity for particles to dislodge from the coating and leave behind irregularities such as, for example, holes and cracks.

To provide a coating with acceptable optical properties such as haze, clarity and the like, various factors such as, for example, the ratio of the first polymer to the second polymer in the coating composition, the solvent or solvents in the carrier liquid, and drying conditions, are selected to result in a random arrangement in which the discontinuous liquid regions of the second phase primarily resemble, when viewed in the plane of the substrate, droplets having an aspect ratio (ratio of length to width) of less than about 3, or less than about 2. In various embodiments, at least about 70%, or at least about 80%, or at least about 90%, of the second phase resembles droplets with an aspect ratio less than about 3, or less than about 2.

For example, to increase the number of droplets with an aspect ratio of less than about 3, or less than about 2, and further increase the haze of the coating, the ratio of the first polymer to the second polymer in the coating composition should be selected to be about 1:1. As another example, if the amount of the first polymer in the coating composition is substantially increased relative to the amount of the second polymer (such as, for example, in a ratio of about 9:1), upon dry-down the discontinuous second phase in the coating can form spike-like projections extending away from the surface of the substrate, and in some embodiments the projections extend above the continuous first phase.

At a given polymer ratio in the coating composition, the process for removal of the carrier liquid can also have an impact on the formation of the phase separated structure. For example, in some embodiments, the coating layer can proceed through a zone drying apparatus wherein the carrier liquid is initially evaporated at a relatively slow rate until phase separation begins to occur. Once the first and the second phases begin to separate, the remainder of the carrier liquid is evaporated at any suitable rate, which can be much faster than the initial drying rate. For example, the carrier liquid can initially be evaporated by applying to the coating layer a heated gas (for example, air) having a temperature of less than about 135° F. (about 60° C.) until sufficient carrier liquid is removed to form the first and the second phases in the coating. Following the onset of phase separation, the temperature of the evaporating gas is gradually increased to no more than the Tg of the substrate until the carrier liquid is substantially removed and the coating layer is dried to form a coating.

As more and more of the carrier liquid is removed from the coating layer, the droplet-like discontinuous regions derived from the second phase coalesce to form projecting structures on and/or intermixed with the substantially continuous first phase. Normal turbulence in the surrounding air can give rise to local gradients along the coating layer surface, and such disturbances will tend to equalize, thereby causing flow. By this flow an equilibrium condition may be reestablished or the flow itself may give rise to a new disturbance because of the gradients down through the coating layer, subsequently leading to a stable flow pattern. In the past, these types of surface flows have usually been avoided in coating operations as they can result in an undulating surface topography, which has been considered a surface defect.

As the carrier liquid is removed from the coating layer, the coating dries to include a pattern with first regions derived from the continuous phase and including a predominant amount of the first polymer, and second regions derived from the discontinuous phases and including a predominant amount of the second polymer. In various embodiments, depending on the first and the second polymers selected, the first regions have a refractive index that differs from the refractive index of the second regions by less than about 0.01, or less than about 0.005, or less than about 0.002.

As discussed above, the thickness and topography of the dried coating can depend on any or all of polymer selection, polymer ratio, solvent selection and ratio of first solvent to second solvent in the carrier liquid, and drying conditions. In some embodiments, the topography of the coating can include relatively equal amounts of the first and the second regions, which forms an undulating surface. In other embodiments, the coating can include more first regions than second regions, wherein the second regions form an arrangement of relatively spaced apart projections extending above the first regions. In additional embodiments, the surface can include more second regions than first regions, wherein the second regions form closely spaced projections extending above the first regions.

Figure 2:
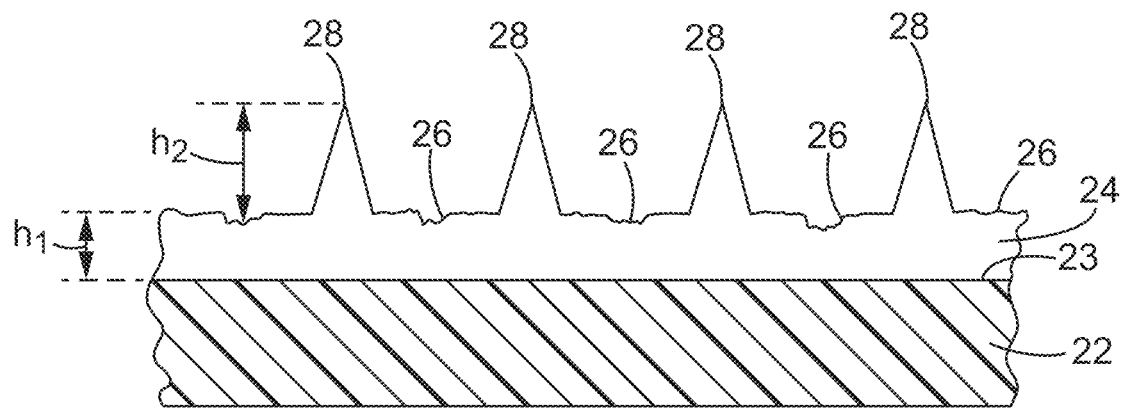
FIG. 2 is a schematic cross-sectional view of a coating layer.

Referring to one embodiment in FIG. 2, a substrate 22 includes a coating 24 on a surface thereof. The coating 24 includes first regions 26 derived from the first phase in the coating composition and second regions 28 derived from the second phase in the coating composition. In various embodiments, the height $h_1$ of the first regions 26 above the surface 23 of the substrate 22 is about 1 μm to about 12 μm. The Peak-to-Valley height (P-V), which is the difference between the highest peak in a sample and the lowest valley, $h_2$, of the second regions 28 above the first regions 26 is about 0.1 μm to about 10 μm, or about 0.1 μm to about 15 μm.

In various embodiments, the root mean square (RMS) roughness of the coating 24 is about 0.01 µm to about 2.0 µm, or about 0.2 µm to about 0.8 µm.

Beaded coatings include areas with beads protruding from the surface, areas with no protruding beads, and areas with clumps of beads protruding significantly above the surface. In contrast, the coatings described in the present disclosure provide more consistent peak sizes across the sample compared to beaded coatings, and can be made to include significantly sized areas with no peaks at all, which allows for more precise design of the coating topography and surface characteristics.

The coating can possess a particular haze value (i.e., light scattering), which can be determined by measuring the haze of the coating with a hazemeter such as those available from Paul N. Gardner Co. (Gardco), Pompano Beach, FL, under the trade designation Haze Guard. A standard (ASTM) test method for haze is defined in ASTM D 1003-00. In various embodiments, the haze value of the coating can be about 1% to about 99%.

The coating can possess a particular clarity level which can be determined by measuring the clarity of the coating with a clarity measuring device such as the Haze Guard from Gardco. A standard (ASTM) test method for clarity is defined in ASTM D1746-09. The amount of clarity in a coating can determine its ability to hide various defects in the film induced during the manufacturing process or through post manufacturing operations. It is of particular value in the optical film industry to develop coatings that possess haze and clarity values in overlapping ranges. To be more specific, it desirable to have clarity values from 1-50% when the haze level varies from 1-50%. There are a limited number of manufacturing technologies available that provide simultaneous access to these low to medium haze and clarity ranges.

Figure 10:
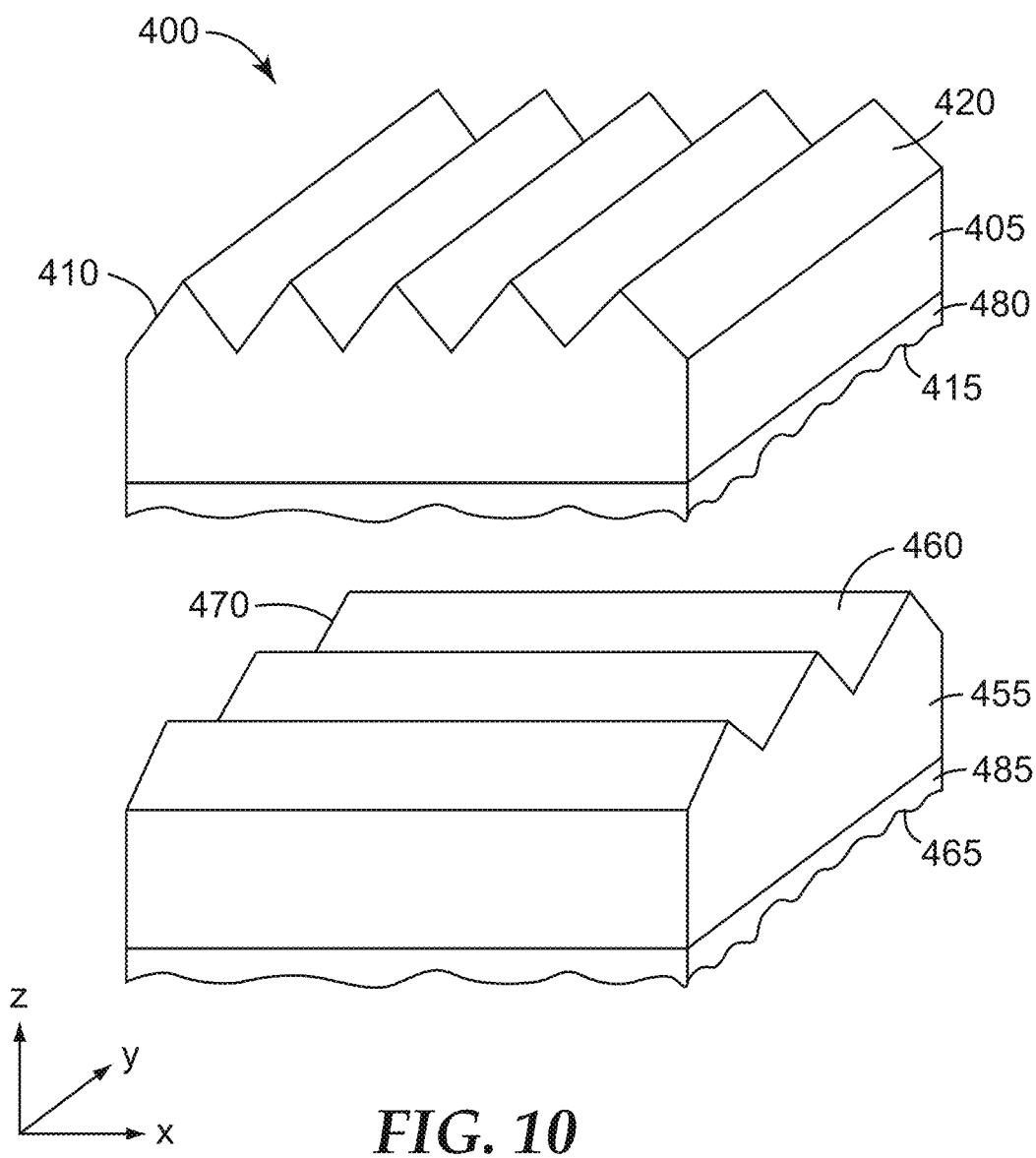
FIG. 10 is a schematic side-view in perspective of an optical stack including a coating as described in the present disclosure.

FIG. 10 is a schematic side-view in perspective of an optical stack 400 that includes a first light redirecting film 405 disposed on a second light redirecting film 455. First light redirecting film 405 includes a first major surface 410 and an opposing second major surface 415. The first major surface includes a first plurality of microstructures 420 that extend along the y-direction. Second light redirecting film 455 includes a third major surface 460 and an opposing fourth major surface 465. Third major surface 460 faces second major surface 415 of the first light redirecting film and includes a third plurality of microstructures 470 that extend along a different direction than the y-direction, such as the x-direction. The light redirecting film 405 includes a matte coating layer 480 that includes second major surface 415. Similarly, second light redirecting film 455 includes a matte layer 485 that includes fourth major surface 465.

In some cases, such as when optical stack 400 of FIG. 10 is included in the backlight of a liquid crystal display, linear microstructures 420 and/or 470 can give rise to moire. In some cases, the two light redirecting films, and in particular, the top light redirecting film, can give rise to color mura, which is due to the index dispersion of the light redirecting films. The first order color mura is typically visible close to the viewing angle limit of the light redirecting film while higher order color mura are typically visible at higher angles. In some cases, such as when major surfaces 415 and 465 of the coating layers 480 and 485 have sufficiently low optical haze and clarity, the optical stack can effectively mask or eliminate moire and color mura without significantly reducing the display brightness.

Figure 11:
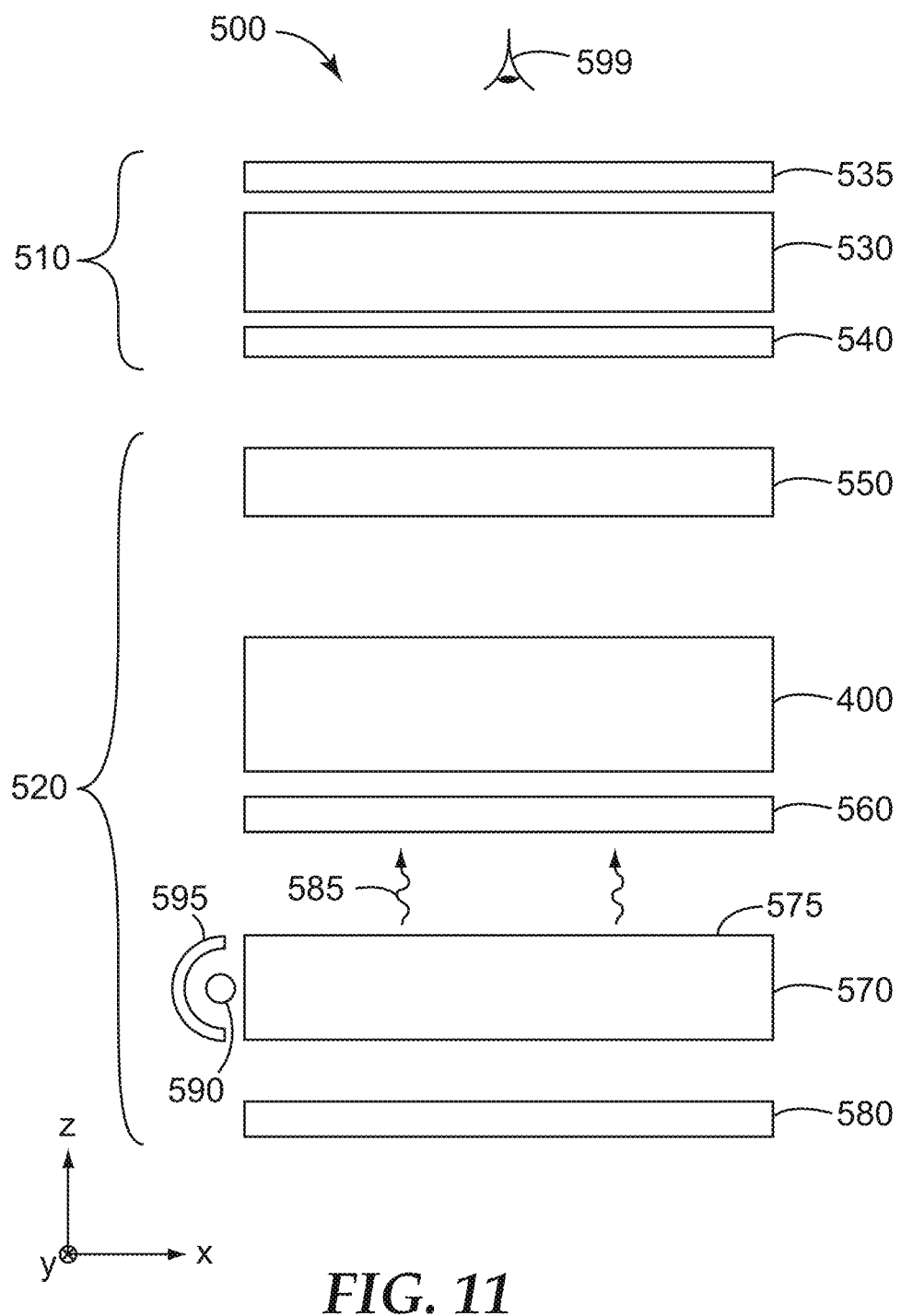
FIG. 11 is a schematic side-view of a display system incorporating an optical element with a coating as described in the present disclosure.

FIG. 11 is a schematic side-view of a display system 500 for displaying information to a viewer 599. The display system 500 includes a liquid crystal panel 510 that is disposed on and is illuminated by a backlight 520. Liquid crystal panel 510 includes a liquid crystal cell 530 that is disposed between linear light absorbing polarizers 535 and 540. In some cases, such as when display system 500 displays an image to viewer 599, liquid crystal panel 510 can be pixilated.

The backlight 520 includes a lightguide 570 that receives light through an edge of the lightguide from a lamp 590 that is housed in a side reflector 595, a back reflector 580 for reflecting light that is incident on the back reflector toward viewer 599, an optical diffuser 560 for homogenizing light 585 that exits from an emitting surface 575 of the lightguide, and optical stack 400 from FIG. 10 disposed between the optical diffuser and a reflective polarizer 550.

As shown in FIG. 10, the optical stack 400 includes light redirecting films 405 and 455. In some cases, linear prisms of the two light redirecting films 405, 455 are orthogonally oriented relative to each other. For example, linear prisms 420 can extend along the y-direction and linear prisms 470 can be oriented along the x-direction. The prismatic microstructures 420 and 470 face away from the lightguide 570.

The optical stack 400 enhances the brightness, such as the on-axis brightness, of the display system. At the same time, respective second and fourth major surfaces 415 and 465 of the optical stack 400 have sufficiently low optical clarities to mask physical defects such as scratches, and hide and/or eliminate optical defects such moire and color mura.

The reflective polarizer 550 substantially reflects light that has a first polarization state and substantially transmits light that has a second polarization state, where the two polarization states are mutually orthogonal. For example, the average reflectance of reflective polarizer 550 in the visible for the polarization state that is substantially reflected by the reflective polarizer is at least about 50%, or at least about 60%, or at least about 70%, or at least about 80%, or at least about 90%, or at least about 95%. As another example, the average transmittance of reflective polarizer 550 in the visible for the polarization state that is substantially transmitted by the reflective polarizer is at least about 50%, or at least about 60%, or at least about 70%, or at least about 80%, or at least about 90%, or at least about 95%, or at least about 97%, or at least about 98%, or at least about 99%. In some cases, reflective polarizer 550 substantially reflects light having a first linear polarization state (for example, along the x-direction) and substantially transmits light having a second linear polarization state (for example, along the y-direction).

Any suitable type of reflective polarizer may be used for reflective polarizer layer 550 such as, for example, a multilayer optical film (MOF) reflective polarizer, a diffusely reflective polarizing film (DRPF) having a continuous phase and a disperse phase, such as those available from 3M Co., St. Paul, MN, under the trade designations Vikuiti Diffuse Reflective Polarizer Film ("DRPF"), a wire grid reflective polarizer described in, for example, U.S. Pat. No. 6,719,426, or a cholesteric reflective polarizer.

For example, in some cases, reflective polarizer 550 can be or include a multilayer optical film (MOF) reflective polarizer, formed of alternating layers of different polymer materials, where one of the sets of alternating layers is formed of a birefringent material, where the refractive indices of the different materials are matched for light polarized in one linear polarization state and unmatched for light in the orthogonal linear polarization state. In such cases, an incident light in the matched polarization state is substantially transmitted through reflective polarizer 550 and an incident light in the unmatched polarization state is substantially reflected by reflective polarizer 550. In some cases, an MOF reflective polarizer 550 can include a stack of inorganic dielectric layers.

As another example, reflective polarizer 550 can be or can include a partially reflecting layer that has an intermediate on-axis average reflectance in the pass state. For example, the partially reflecting layer can have an on-axis average reflectance of at least about 90% for visible light polarized in a first plane, such as the xy-plane, and an on-axis average reflectance in a range from about 25% to about 90% for visible light polarized in a second plane, such as the xz-plane, perpendicular to the first plane. Such partially reflecting layers are described in, for example, U.S. Patent Publication No. 2008/064133, the disclosure of which is incorporated herein in its entirety by reference.

In some cases, reflective polarizer 550 can be or include a circular reflective polarizer, where light circularly polarized in one sense, which may be the clockwise or counterclockwise sense (also referred to as right or left circular polarization), is preferentially transmitted and light polarized in the opposite sense is preferentially reflected. One type of circular polarizer includes a cholesteric liquid crystal polarizer.

In some cases, reflective polarizer 550 can be a multilayer optical film that reflects or transmits light by optical interference, such as those described in, for example, U.S. Pat. Nos. 8,662,687, 8,608,363, 8,917,448 and 8,988,776; and U.S. Published Patent Applications US 2011/0222263, all incorporated by reference herein in their entirety.

Optical diffuser 560 has the primary functions of hiding or masking lamp 590 and homogenizing light 585 that is emitted by lightguide 570. Optical diffuser 560 has a high optical haze and/or a high diffuse optical reflectance. For example, in some cases, the optical haze of the optical diffuser is not less than about 40%, or not less than about 50%, or not less than about 60%, or not less than about 70%, or not less than about 80%, or not less than about 85%, or not less than about 90%, or not less than about 95%. As another example, the diffuse optical reflectance of the optical diffuser is not less than about 30%, or not less than about 40%, or not less than about 50%, or not less than about 60%.

Optical diffuser 560 can be or include any optical diffuser that may be desirable and/or available in an application. For example, optical diffuser 560 can be or include a surface diffuser, a volume diffuser, or a combination thereof. For example, optical diffuser 560 can include a plurality of particles having a first index of refraction $n_1$ dispersed in a binder or host medium having a different index of refraction $n_2$, where the difference between the two indices of refraction is at least about 0.01, or at least about 0.02, or at least about 0.03, or at least about 0.04, or at least about 0.05.

Back reflector 580 receives light that is emitted by the lightguide away from viewer 599 along the negative z-direction and reflects the received light towards the viewer. Display systems such as display system 500 where lamp 590 is placed along an edge of a lightguide, are generally referred to as edge-lit or backlit displays or optical systems. In some cases, the back reflector can be partially reflective and partially transmissive. In some cases, the back reflector can be structured, for example, have a structured surface.

Back reflector 580 can be any type reflector that may be desirable and/or practical in an application. For example, the back reflector can be a specular reflector, a semi-specular or semi-diffuse reflector, or a diffuse reflector, such as those disclosed in International Patent Application No. PCT/US 2008/064115, incorporated herein by reference in its entirety. For example, the reflector can be an aluminized film or a multi-layer polymeric reflective film, such as an enhanced specular reflector (ESR) film available from 3M. As another example, back reflector 580 can be a diffuse reflector having a white appearance.

In addition to the optical stack 400 (FIG. 11), the coatings described herein can be applied on a surface of any of the optical elements in the display system 500 including, for example, the linear polarizer 540, the reflective polarizer 550, the diffuser 560, or the back reflector 580. For example, a coating can be applied to the reflective polarizer to enhance diffusion, hide defects, reduce Moire and/or color mura, and reduce imprinting of adjacent optical elements. A coating applied to the back reflector 580 can, in some embodiments, improve diffuse reflectance and/or enhance defect hiding. In some embodiments, applying a coating to the diffuser 560 can reduce interference patterns such as Newton's rings between the diffuser 560 and an adjacent optical element.

In various embodiments, an optical element including the coating layer can be used on a variety of display and protective articles where durability (e.g., abrasion resistance) may be desired while maintaining optical clarity and haze suitable for an anti-glare coating. For example, a coating with an undulating surface might be applied to form an anti-glare or diffusive coating on a display such as LCDs, plasma displays, front and rear projection displays, cathode ray tubes (CRTs), signage, as well as single-character or binary displays such as light emitting diodes (LEDs), signal lamps and switches. In various embodiments, the coatings described herein may be useful as a protective coating for displays having a viewing surface that is susceptible to damage during normal use. In other embodiments, an optical element with a significant number of larger projections extending above the surface of the substrate may be useful to prevent wet-out and pattern formation when another polymeric film is applied on the coating or the coating is placed adjacent to another optical element.

The optical element and the coating of the present disclosure can be employed in a variety of portable and non-portable information display devices including PDAs, mobile telephones (including combination PDA/cell phones), touch-sensitive screens, wrist watches, car navigation systems, global positioning systems, depth finders, calculators, electronic books, CD or DVD players, projection television screens, computer monitors, notebook computer displays, instrument gauges, instrument panel covers, signage such as graphic displays (including indoor and outdoor graphics), and the like. These devices can have planar viewing faces, or non-planar viewing faces such as the slightly curved face of a typical CRT. The display element can be located on or in close physical proximity to a viewing face of the information display device rather than being spaced an appreciable distance therefrom.

The optical element and coating of the present disclosure can be employed on a variety of other articles as well, such as, for example, camera lenses, eyeglass lenses, binocular lenses, retroreflective sheeting, dry erase boards, floor films, automobile windows, building windows, train windows, boat windows, aircraft windows, vehicle headlamps and taillights, display cases, eyeglasses, watercraft hulls, road pavement markings, overhead projectors, stereo cabinet doors, stereo covers, furniture, bus shelter plastic, watch covers, as well as optical and magneto-optical recording disks, and the like.

EXAMPLES

| Component | Available from | Description |
| --- | --- | --- |
| Elvacite 2028 | Lucite Int'l, Memphis, TN | n-Butyl methacrylate/ethyl methacrylate/acrylic acid copolymer |
| Elvacite 2042 | Lucite Int'l | Ethyl methacrylate polymer |
| Elvacite 2044 | Lucite Int'l | n-Butyl methacrylate polymer |
| Elvacite 2046 | Lucite Int'l | n-Butylmethacrylate /isobutyl methacrylate copolymer |
| CAB 381-20 | Eastman Chemical, Kingsport, TN | Cellulose acetate butyrate |
| CAP 504-0.2 | Eastman Chemical | Cellulose acetate propionate |
| CA 398-6 | Eastman Chemical | Cellulose acetate |
| CAP 482-0.5 | Eastman Chemical | Cellulose acetate propionate |
| MEK | Avantor Performance Materials, Center Valley, PA | Methyl ethyl ketone |
| Dowanol PM | Dow Chemical, Midland, MI | 1-methoxy-2-propanol |
| IPA | VWR Int'l Radnor, PA | Isopropyl alcohol |

Example 1 (1:1 Elvacite 2028:CAP 504-0.2)

A 10% premix of Elvacite 2028 was prepared by dissolving 10 grams in IPA (90 g) under high shear using a Cowles type disperser. In a separate vessel, a 10% premix of CAP 504-0.2 was prepared by dissolving 10 g in Dowanol PM (90 g) under high shear using a Cowles type disperser. Equal parts (20 g) of each premix were combined under agitation. The coating solution was cast onto PET film using a notch-bar hand coater at a 2-3 mil coating gap. The coating was dried in an oven at 80° C. for 3 minutes. Evaporation of the solvent gave a coating with thickness about 4 µm.

The components used in Example 1 are shown in Table 1 below:

TABLE 1

| Component | Amount (g) | wt % on Total |
| --- | --- | --- |
| Elvacite 2028 | 2 | 5 |
| IPA | 18 | 45 |
| CAP 504-0.2 | 2 | 5 |
| Dowanol PM | 18 | 45 |

The coated sheet was observed using optical microscopy (Keyence VHX-S50 with VH-Z100R lens, available from Keyence Corp., Osaka, Japan) and found to have a discontinuous phase including over 90% droplets with an aspect ratio of less than 3. Surface metrology observations with a gel microscope (Gelsight Benchtop V1, available from Gelsight, Inc., Waltham, MA) showed a uniform distribution of surface features with a peak to valley height of 1.74 µm, average roughness 0.24 µm and RMS roughness 0.29 µm. Transmission (91.8%), haze (22.9%) and clarity (79.9%) were measured using a Haze Guard Plus hazemeter (Gardco, Pompano Beach, FL).

Example 2 (1:3 CAB 381-20:Elvacite 2044)

A 10% premix of CAB 381-20 was prepared by dissolving 10 grams in Dowanol PM (90 g) under high shear using a Cowles type disperser. In a separate vessel, a 10% premix of Elvacite 2044 was prepared by dissolving 10 g in Dowanol PM (90 g) under high shear using a Cowles type disperser. One part CAB premix (10 g) to 3 parts Elvacite premix (30 g) were combined under agitation. The coating solution was cast onto PET film using a notch-bar hand coater at a 2-3 mil coating gap. The coating was dried in an oven at 80° C. for 3 minutes. Evaporation of the solvent gave a coating with thickness about 4 µm. The components used in Example 2 are shown in Table 2 below:

TABLE 2

| Component | Amount (g) | % on Total |
| --- | --- | --- |
| CAB 381-20 | 1 | 2.5 |
| Dowanol PM | 9 | 22.5 |
| Elvacite 2044 | 3 | 7.5 |
| Dowanol PM | 27 | 67.5 |

The coated sheet was observed using optical microscopy (Keyence VHX-S50 with VH-Z100R lens) and found to have a discontinuous phase including over 90% droplets with an aspect ratio of less than 3. Surface metrology observations with the gel microscope (Gelsight Benchtop V1) showed a uniform distribution of surface features with a peak to valley height of 2.67 um, average roughness 0.39 um and RMS roughness 0.47 um. Transmission (93.2%), haze (16.3%) and clarity (82.6%) were measured using the Haze Guard hazemeter.

Example 3 (1:3 Elvacite 2042:Elvacite 2046)

A 10% premix of Elvacite 2042 was prepared by dissolving 10 grams in MEK (90 g) under high shear using a cowles type disperser. In a separate vessel, a 10% premix of Elvacite 2046 was prepared by dissolving 10 g in Dowanol PM (90 g) under high shear using a cowles type disperser. One part Elvacite 2042 premix (10 g) to 3 parts Elvacite 2046 premix (30 g) were combined under agitation. The coating solution was cast onto PET film using a notch-bar hand coater at a 2-3 mil coating gap. The coating was dried in an oven at 80° C. for 3 minutes. Evaporation of the solvent gave a coating with thickness 3-4 µm. The components used in Example 3 are shown in Table 3 below:

TABLE 3

| Component | Amount (g) | % on Total |
| --- | --- | --- |
| Elvacite 2042 | 1 | 2.5 |
| MEK | 9 | 22.5 |
| Elvacite 2046 | 3 | 7.5 |
| Dowanol PM | 27 | 67.5 |

The coated sheet was observed using optical microscopy (Keyence VHX-S50 with VH-Z100R lens) and found to have a discontinuous phase including over 90% droplets with an aspect ratio of less than 3. Surface metrology observations with the gel microscope (Gelsight Benchtop V1) showed a uniform distribution of surface features with a peak to valley height of 1.90 um, average roughness 0.23 um and RMS roughness 0.30 um. Transmission (93.2%), haze (15.1%) and clarity (79.3%) were measured using the Haze Guard hazemeter.

Example 4 (1:3 CA 398-6:CAP 482-0.5)

A 10% premix of CA 398-6 was prepared by dissolving 10 grams in MEK (90 g) under high shear using a Cowles type disperser. In a separate vessel, a 10% premix of CAP 482-0.5 was prepared by dissolving 10 g in Dowanol PM (90 g) under high shear using a Cowles type disperser. One part CA premix (10 g) to 3 parts CAP premix (30 g) were combined under agitation. The coating solution was cast onto PET film using a notch-bar hand coater at a 2-3 mil coating gap. The coating was dried in an oven at 80° C. for 3 minutes. Evaporation of the solvent gave a coating with thickness about 4 um.

The components used in Example 4 are shown in Table 4 below:

TABLE 4

| Component | Amount (g) | % on Total |
|---|---|---|
| CA 398-6 | 1 | 2.5 |
| MEK | 9 | 22.5 |
| CAP 482-0.5 | 3 | 7.5 |
| Dowanol PM | 27 | 67.5 |

The coated sheet was observed using optical microscopy (Keyence VHX-S50 with VH-Z100R lens) and found to have a discontinuous phase including over 90% droplets with an aspect ratio of less than 3. Surface metrology observations with the gel microscope (Gelsight Benchtop V1) showed a uniform distribution of surface features with a peak to valley height of 9.06 um, average roughness 1.34 um and RMS roughness 1.87 μm. Transmission (93.9%), haze (18.4%) and clarity (86.6%) were measured using the Haze Guard hazemeter.

Example 5 (1:1 CA 398-6:CAB 381-20)

A 10% premix of CA 398-6 was prepared by dissolving 10 grams in MEK (90 g) under high shear using a Cowles type disperser. In a separate vessel, a 10% premix of CAB 381-20 was prepared by dissolving 10 g in MEK (90 g) under high shear using a Cowles type disperser. One part CA premix (10 g) to 1 parts CAB premix (30 g) were combined under agitation. The coating solution was cast onto PET film using a notch-bar hand coater at a 2-3 mil coating gap. The coating was dried in an oven at 80° C. for 3 minutes. Evaporation of the solvent gave a coating with thickness about 4 μm.

The components used in Example 5 are shown in Table 5 below:

TABLE 5

| Component | Amount (g) | % on Total |
|---|---|---|
| CA 398-6 | 1 | 5 |
| MEK | 18 | 90 |
| CAB 381-20 | 1 | 5 |

The coated sheet was observed using optical microscopy (Keyence VHX-S50 with VH-Z100R lens) and found to have a discontinuous phase including over 90% droplets with an aspect ratio of less than 3. Surface metrology observations with the gel microscope (Gelsight Benchtop V1) showed a uniform distribution of surface features with a peak to valley height of 6.67 μm, average roughness 1.00 μm and RMS roughness 1.27 μm. Transmission (95.3%), haze (71.5%) and clarity (49.2%) were measured using the Haze Guard hazemeter.

Examples 6 Through 18

The coating composition was made by first dissolving polymer #2 in the two blended solvents (referred to herein as solvent #1 and solvent #2) and mixing until dissolved. The polymer #1 was then added and mixed until dissolved. The solution was coated on to a PET film at 30 meters per minute (mpm), and dried at 50° C. for about 2 minutes.

Polymer #1 for Examples 6-14 was CAB 381-2 and Polymer #2 was CA 398-6. Solvent #1 for Examples 6-14 was methyl ethyl ketone (MEK) and Solvent #2 was Dowanol PM.

Polymer #1 for Examples 15-18 was CAB 381-20 and polymer #2 was CA 398-30, while solvent #1 was MEK and solvent #2 was Dowanol PM.

The results are shown in Table 6 below.

TABLE 6

| Ex | % Polymer #1 | % Polymer #2 | % Solvent #1 | % Solvent #2 | Dry Thickness (μm) | Transmission (%) | Haze (%) | Clarity (%) | Droplets with aspect ratio less than 3 (%) | P-V Height (μm) | RMS Roughness (μm) |
|---|---|---|---|---|---|---|---|---|---|---|---|
| 6 | 65 | 35 | 50 | 50 | 6 | 89.9 | 74.3 | 20.4 | >90 | 3.67 | 0.57 |
| 7 | 65 | 35 | 50 | 50 | 5 | 89.9 | 74.9 | 24.2 | >90 | 3.9 | 0.67 |
| 8 | 65 | 35 | 50 | 50 | 4 | 90.3 | 75.6 | 38.8 | >90 | 3.29 | 0.55 |
| 9 | 65 | 35 | 75 | 25 | 6 | 90.0 | 78.9 | 22.5 | >90 | 3.95 | 0.75 |
| 10 | 65 | 35 | 75 | 25 | 5 | 90.2 | 79.3 | 30.1 | >90 | 4.18 | 0.73 |
| 11 | 65 | 35 | 75 | 25 | 4 | 90.6 | 74.6 | 46.6 | >90 | 4.22 | 0.76 |
| 12 | 75 | 25 | 50 | 50 | 5 | 89.9 | 58.9 | 50.2 | >90 | 2.28 | 0.35 |
| 13 | 80 | 20 | 50 | 50 | 5 | 93.6 | 45.2 | 54.0 | >90 | 1.91 | 0.32 |
| 14 | 80 | 20 | 75 | 25 | 5 | 91.7 | 16.5 | 85.0 | >90 | 1.97 | 0.24 |
| 15 | 90 | 10 | 50 | 50 | 4 | 91.8 | 7.4 | 97.1 | >90 | 1.1 | 0.18 |
| 16 | 90 | 10 | 10 | 90 | 2 | 92.5 | 9.0 | 96.7 | >90 | 3.55 | 0.6 |
| 17 | 50 | 50 | 50 | 50 | 4 | 86.9 | 93.1 | 25.9 | >90 | 3.82 | 0.62 |
| 18 | 40 | 60 | 50 | 50 | 5 | 90.8 | 60.1 | 51.1 | >90 | 2.48 | 0.45 |

Figure 3:
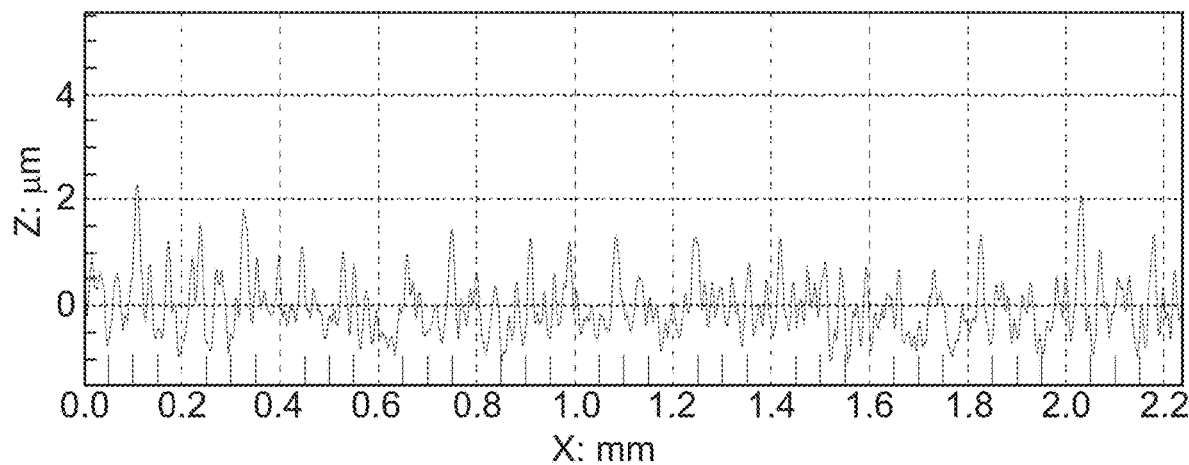
FIG. 3 is a plot of the topography of the coating of Example 8.
Figure 4:
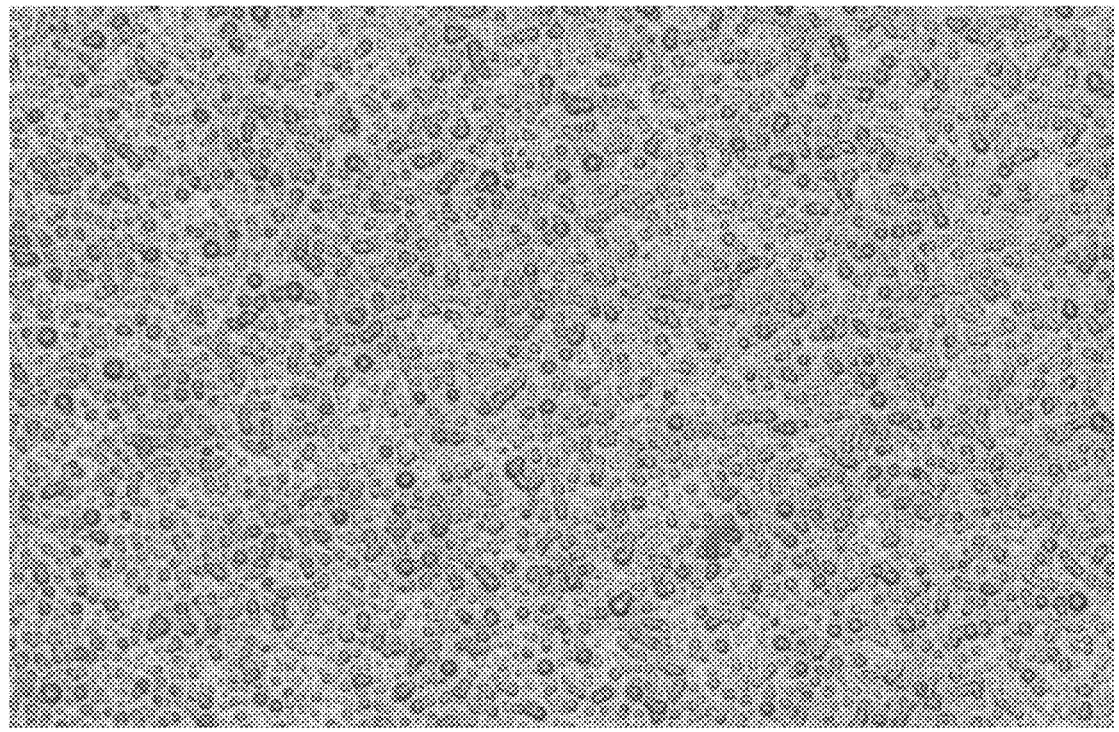
FIG. 4 is a photograph of the surface of the coating of Example 8.
Figure 5:
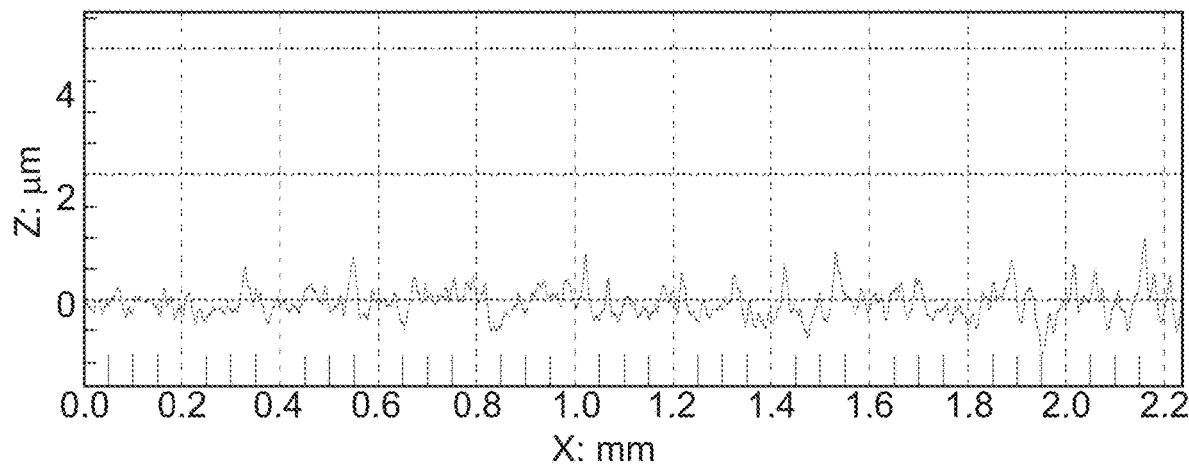
FIG. 5 is a plot of the topography of the surface of Example 14.
Figure 6:
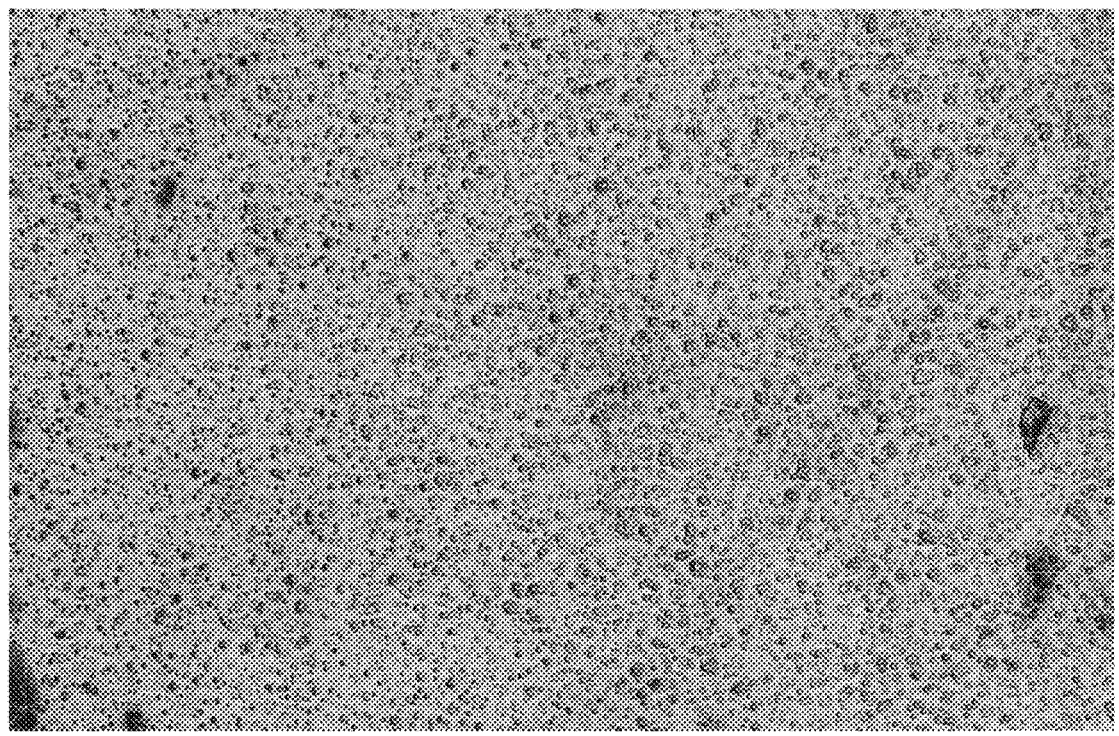
FIG. 6 is a photograph of the surface of the coating of Example 14.

FIG. 3 is a plot of the structure of the surface of Example 8, and FIG. 4 is a photograph of the surface. FIG. 5 is a plot of the structure of the surface of Example 14, and FIG. 6 is a photograph of the surface. The plots of FIGS. 3 and 5 were obtained using the Gelsight Benchtop Scanner model V1, and the photographs of FIGS. 4 and 6 were taken using optical microscopy (Keyence VHX-S50 with VH-Z100R lens). The higher haze sample had higher protrusions which increase haze.

Examples 19-21

The solution was made by first dissolving polymer #2 in the two blended solvents (referred to herein as solvent #1 and solvent #2) and mixing until dissolved. The polymer #1 was then added and mixed until dissolved. The solution was coated on to PET film at 30 mpm and dried at 50° C. for about 2 minutes.

Polymer #1 for Examples 19-21 was CAB 381-20, and polymer #2 was CA 398-30. Solvent #1 for Examples 19-21 was MEK, and solvent #2 was Dowanol PM.

The results are shown in Table 7 below.

TABLE 7

| Ex | % Polymer #1 | % Polymer #2 | % Solvent #1 | % Solvent #2 | Dry Thickness (μm) | Transmission (%) | Haze (%) | Clarity (%) | Droplets with aspect ratio less than 3 (%) | Effective Transmission |
|---|---|---|---|---|---|---|---|---|---|---|
| 19 | 50 | 50 | 60 | 40 | 6 | 90.2 | 88.8 | 22.3 | >90 | 1.132 |
| 20 | 50 | 50 | 60 | 40 | 5 | 91 | 88.7 | 30.2 | >90 | 1.135 |
| 21 | 50 | 50 | 60 | 40 | 4 | 90.6 | 87.7 | 42.6 | >90 | 1.139 |

When light diffusing film is used in a liquid crystal display system, the film can increase or improve the axial brightness of the display. In such cases, the film has an effective transmission or relative gain that is greater than 1. As used herein, effective transmission is the ratio of the axial luminance of the display system with the film in place in the display system to the axial luminance of the display without the film in place.

Effective transmission (ET) can be measured using an optical system. The optical system is centered on an optical axis and includes a hollow lambertian light box that emits a lambertian light through an emitting or exit surface, a linear light absorbing polarizer, and a photo detector. The light box is illuminated by a stabilized broadband light source that is connected to an interior of the light box via an optical fiber. A test sample, the ET of which is to be measured by the optical system, is placed at location between the light box and the absorbing linear polarizer. (Described in WO 13096324).

Examples 22-24

The solution was made by first dissolving polymer #2 in the two blended solvents (referred to as solvent #1 and solvent #2) and mixing until dissolved. The polymer #1 was then added and mixed until dissolved. The solution was coated on to 30 μm thick PET film at 30 mpm and dried at 50° C. for about 2 minutes. Polymer #1 for Examples 22-24 was CAB 381-20, and polymer #2 was CA 398-30. Solvent #1 for Examples 22-24 was MEK and Solvent #2 was Dowanol PM.

The results are shown in Table 8 below.

TABLE 8

| Ex | % Polymer #1 | % Polymer #2 | % Solvent #1 | % Solvent #2 | Dry Thickness (μm) | Transmission (%) | Haze (%) | Clarity (%) | Droplets with aspect ratio less than 3 (%) | P-V Roughness (μm) | RMS Roughness (μm) | Wet Out |
|---|---|---|---|---|---|---|---|---|---|---|---|---|
| 22 | 90 | 10 | 10 | 90 | 2 | 93 | 6.6 | 97.2 | >90 | 3.78 | 0.48 | 0.49 |
| 23 | 92 | 8 | 10 | 90 | 3 | 93.8 | 9 | 96.7 | >90 | 3.55 | 0.48 | 0.46 |
| 24 | 92 | 8 | 10 | 90 | 2 | 93.9 | 6.6 | 96.9 | >90 | 3.33 | 0.48 | 0.66 |

Wet out is optical coupling of the film and a flat surface, such as glass. The optical coupling cause's transmission of light that would otherwise be reflected. Wet out issues become particularly difficult as the substrate becomes more flexible. This is true for PET film below 40 m thickness. The test method was to place a sample upon a glass plate with an applied pressure of 988 grams on a sample cut to 38 mm by 64 mm. Light was applied from the backside and a PR650 camera measures the light coming through. The desired value is <1.0.

Examples 25-26

The solution was made by first dissolving polymer #2 in the two blended solvents (referred to as solvent #1 and solvent #2) and mixing until dissolved. The polymer #1 was then added and mixed until dissolved. The solution was coated on to 30 μm thick PET film (Example 25) and 51 μm PET film (Example 26) at 30 mpm and dried at 50° C. for about 2 minutes.

Polymer #1 for Example 25 was CAB 381-20, and polymer #2 was CA 398-30. Polymer #1 for Example 26 was CAB 381-2 and polymer #2 was CA 398-6.

Solvent #1 for Examples 25-26 was MEK and Solvent #2 was Dowanol PM.

The results are shown in Table 9 below.

TABLE 9

| Ex | % Polymer #1 | % Polymer #2 | % Solvent #1 | % Solvent #2 | Dry Thickness (μm) | Coated Film Haze | Planarized Coated Film Haze | Uncoated Film Haze |
|---|---|---|---|---|---|---|---|---|
| 25 | 25 | 75 | 25 | 75 | 2.5 | 52.9 | 0.39 | 0.80 |
| 26 | 25 | 75 | 25 | 75 | 4 | 54.5 | 0.41 | 1.08 |

The textured surfaces in the examples produce mainly surface haze. Surface haze is established by planarizing the surface with a monomer similar in refractive index then the polymers. SR9003 (Sartomer) has a refractive index of 1.486 when coated and cured (same measurement technique used for polymers).

Examples 27-33

The adhesion test involved cutting the film with a commercial scissors and applying 3M 610 tape on the edge. The tape was then pulled back towards the film at about a 450 angle. The rating was then 1 for total removal of coating from the substrate, 3 for partial removal, where there is layer separation or cohesion failure, and 5 is no removal. Three tests were run and the average recorded. In these Examples described below in Table 10, polymer #1 was CAB 381-20 and polymer #2 was CA 398-30. In the Examples of Table 10, Solvent #1 was MEK and solvent #2 was Dowanol PM. These specimens were made with the same technique described for Examples 6-18 above.

TABLE 10

| Ex | % Polymer #1 | % Polymer #2 | Solvent #1 (%) | Solvent #2 (%) | Dry Thickness (μm) | Adhesion |
|---|---|---|---|---|---|---|
| 27 | 20 | 80 | 25 | 75 | 4 | 3 |
| 28 | 25 | 75 | 25 | 75 | 4 | 3 |
| 29 | 35 | 65 | 25 | 75 | 4 | 5 |
| 30 | 60 | 40 | 25 | 75 | 4 | 5 |
| 31 | 65 | 35 | 25 | 75 | 4 | 5 |
| 32 | 25 | 75 | 75 | 25 | 4 | 3 |
| 33 | 25 | 75 | 25 | 75 | 2.5 | 3 |

Examples 34-36

These samples were made and tested with the same technique described for Samples 6-18 above. Polymer #1 is CAB 381-2 and Polymer #2 is CA 398-6. Results are shown in Table 11.

TABLE 11

| Ex | % Polymer #1 | % Polymer #2 | Solvent #1 | % Solvent #1 | Solvent #2 | % Solvent #2 | Dry Thickness (μm) | Transmission (%) | Haze (%) | Clarity (%) |
|---|---|---|---|---|---|---|---|---|---|---|
| 34 | 35 | 65 | Acetone | 80 | Cyclohexanone | 20 | 6 | 93.5 | 29 | 34 |
| 35 | 80 | 20 | MEK | 50 | Dowanol PM | 50 | 6 | 90.7 | 45 | 43 |
| 36 | 70 | 30 | MEK | 80 | Dowanol PM | 20 | 5 | 90.4 | 51 | 45 |

Example 37—Refractive Index of Polymers

The refractive indices in the Examples were taken using the data obtained with a prism coupler available from the Metricon Corp., Pennington, NJ, under the trade designation Model 2010/M, and exported into an Excel macro called an Index Finder. The macro used least squares to fit a series of lines along the curve generated by the prism coupler. The curve with a maximum slope resembled a rising part of the knee, and the software evaluated slopes after the maximum and fount a minimum (close to flat line). The two lines defined the knee and their intercept was the refractive index.

The exact lots of polymers used in the Examples were tested for refractive index, and the results are shown in Table 12. Tg values in FIG. 12 were obtained from the literature.

TABLE 12

| Component | Refractive Index | Tg (° C.) (From Literature) |
|---|---|---|
| CA 398-6 | 1.475 | 182 |
| CAP 482-0.5 | 1.473 | 142 |
| Elvacite 2042 | 1.480 | 63 |
| Elvacite 2046 | 1.484 | 35 |
| CAB 381-20 | 1.473 | 141 |
| Elvacite 2044 | 1.483 | 20 |
| CAP 504-0.2 | 1.479 | 159 |
| Elvacite 2028 | 1.479 | 45 |
| CA 398-30 | 1.473 | 189 |
| CAB 381-2 | 1.473 | 133 |

Table 13 shows the absolute value of the refractive index difference between polymer #1 and polymer #2 for Examples 1-18 above.

TABLE 13

| Example | Refractive Index Difference |
|---|---|
| 1 | 0 |
| 2 | 0.01 |
| 3 | 0.004 |
| 4 | 0.002 |
| 5 | 0.002 |
| 6-14 | 0.002 |
| 15-18 | 0 |

Example 38—Ball Drop Test

The coatings described in various Examples above were subjected to a ball drop test to evaluate the capacity of the coatings to resist damage caused by impacts typically encountered when an optical device including the coatings is used by a consumer.

Figure 7:
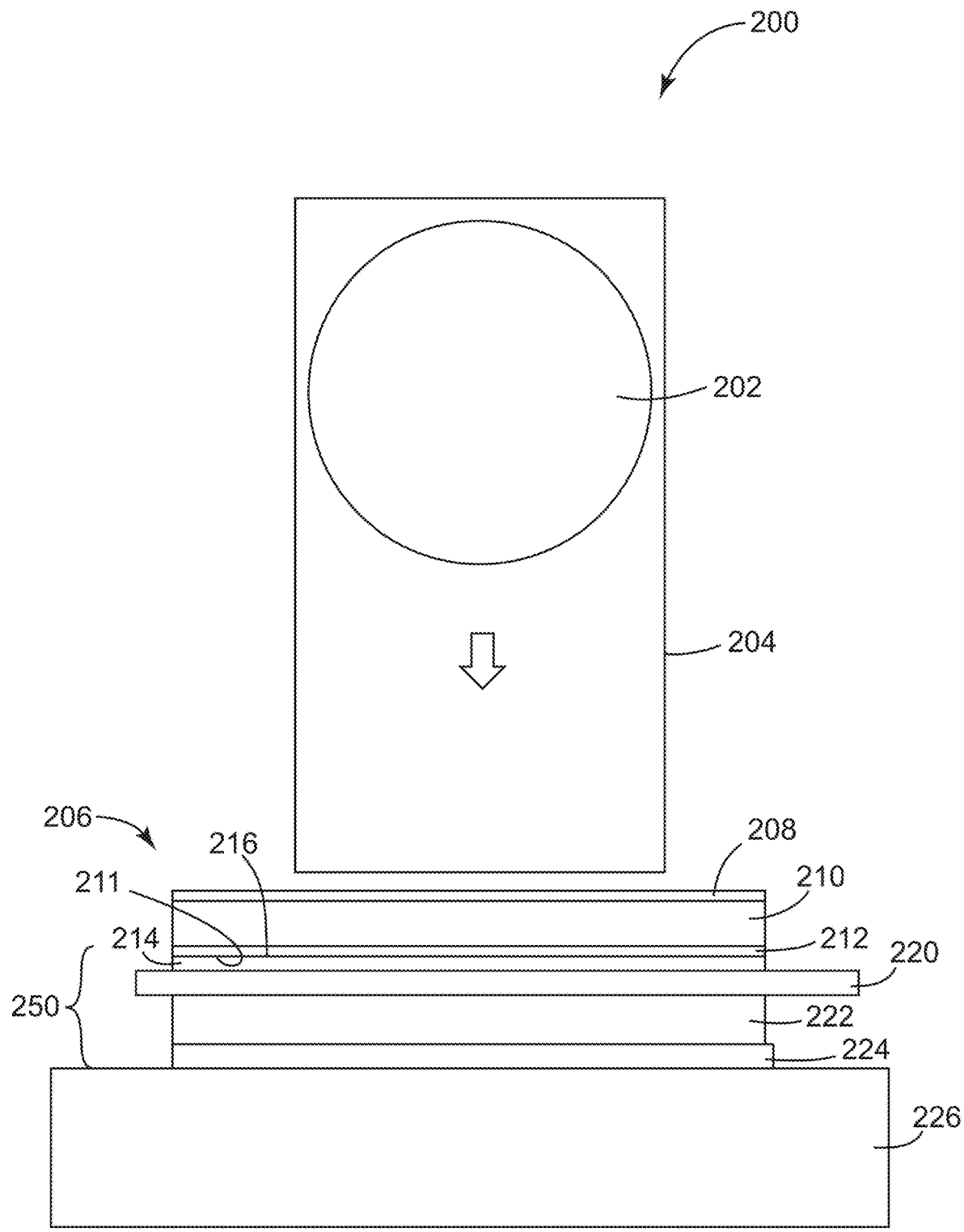
FIG. 7 is a schematic diagram of a ball drop test apparatus used in Example 38 below.

Referring to the schematic diagram in FIG. 7, the ball drop test apparatus 200 included a 175 gram polymeric ball 202 with a diameter of about 2.5 inches (6.35 cm), which was placed in a guide tube 204. The ball 202 was raised a height $h_B$ of about 50 cm above a surface of a coating test unit 206. The coating test unit 206 included a protective polymeric film 208 over a rigid polymeric plate 210. A lightguide unit 250 included a coating construction 21 ion a diffuser 220, and a coating layer 224 on a rigid polymeric lightguide element 222. The coating construction 211 included a polymeric film 212 placed over a coating layer 214, with an optically clear adhesive layer 216 therebetween. The diffuser layer 220 was placed over the lightguide element 222. The coating test unit 206 was placed on a rigid polymeric support 226.

Figure 8A:
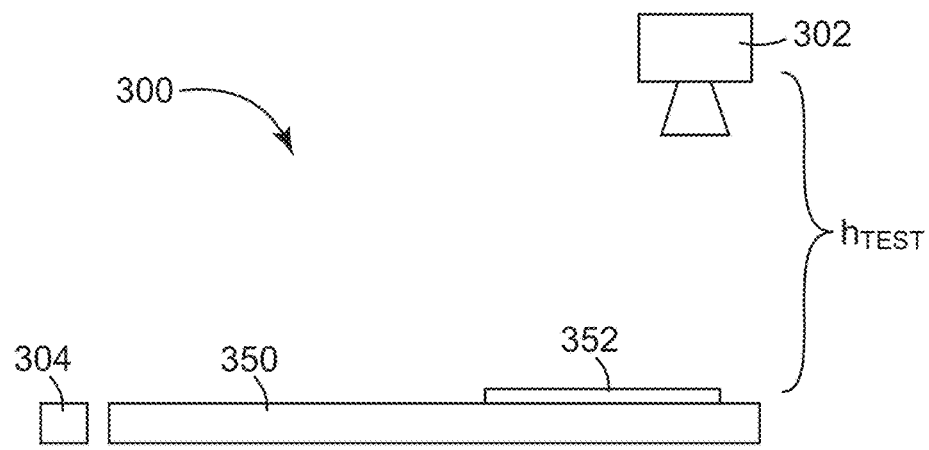
FIG. 8A is a schematic diagram of a test apparatus used in Example 38 below to evaluate the damage to a coating caused by the impact of a ball in a ball drop test.

Referring to FIG. 8A, a damage test apparatus 300 included an imaging colorimeter 302 available from Radiant Zemax LLC, Redmond, WA, under the trade designation Prometric. The colorimeter 302 was placed a height $H_{test}$ of about 70 cm above a coating 352 on a damaged lightguide unit 350. An arrangement of edge illuminating LEDs 304 was used to emit light into the lightguide unit 350 and evaluate the damage to the coating 352 on a surface thereof.

Figure 8B:
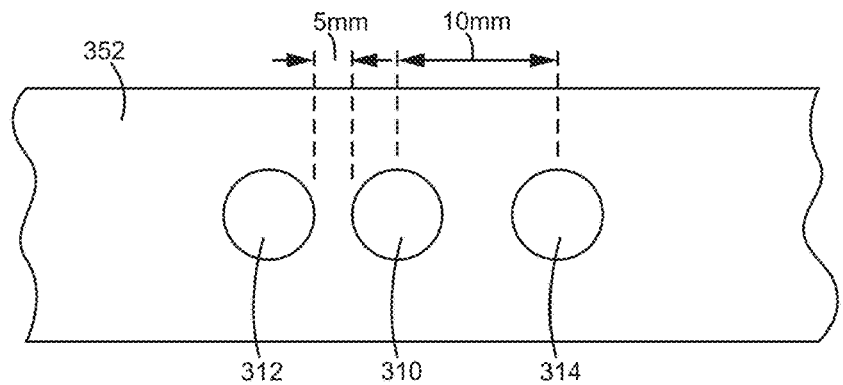
FIG. 8B is a schematic diagram of areas of a coating used to determine a damage contrast metric reported in Example 38 and Table 14 below.
Figure 9:
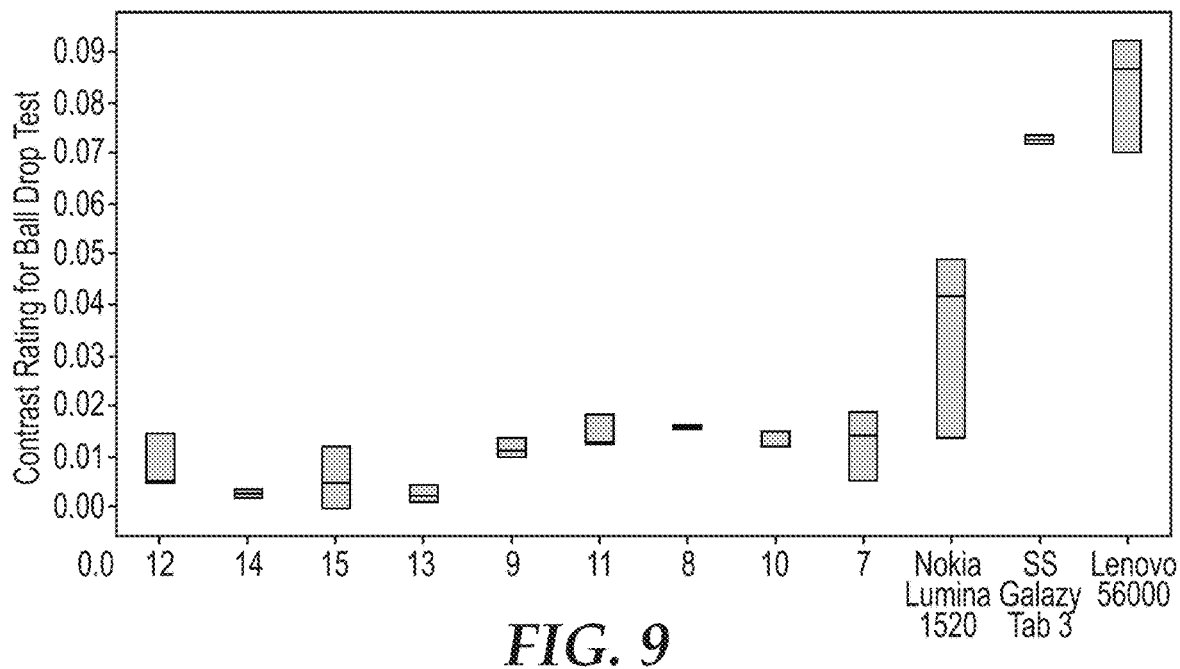
FIG. 9 is a plot of the contrast rating of the ball drop data of Example 38 and Table 14.

Referring to FIG. 8B, using the colorimeter 302 in the test setup 300 of FIG. 8A, the luminance of an area of the surface coating 352 damaged by the dropping ball, referred to herein as the first circular area 310, was evaluated. The colorimeter 302 was then used to evaluate the luminance of a second circular area 312 about 5 mm away from an edge of the first circular area 310. The second circular area 312 was covered by an adhesive-backed matte finish tape flag available from 3M under the trade designation Post-it to provide a reference for maximum light guide extraction. The colorimeter 302 was then utilized to measure the luminance of an undamaged third circular area 314 about 10 mm away from a center of the first circular area 310. A damage contrast value was determined by the following equation:

Damage contrast=[(luminance of area 310–luminance of area 314)/luminance of area 312].

The results are shown in Table 14 for various coatings in the examples above.

As shown in Table 14, the damage contrast results for the coatings in the present disclosure were also compared to the ball drop tests for bottom diffuser films from the displays on a mobile telephone available under the trade designation Lumina 1520 from Nokia, a tablet computer available under the trade designation Galaxy Tablet 3 from Samsung, and a tablet computer available under the trade designation 56000 from Lenovo.

TABLE 14

| Example | 12 | 14 | 15 | 13 | 9 | 11 | 8 | 10 | 7 | Nokia Lumina 1520 | SS Galaxy Tab 3 | Lenovo 56000 |
|---|---|---|---|---|---|---|---|---|---|---|---|---|
| Contrast Ratings | 0.0146 | 0.0035 | 0.0047 | 0.0042 | 0.0137 | 0.0126 | 0.0155 | 0.0150 | 0.0139 | 0.0417 | 0.0718 | 0.0867 |
|  | 0.0047 | 0.0017 | 0.0121 | 0.0009 | 0.0100 | 0.0184 | 0.0160 | 0.0118 | 0.0051 | 0.0134 | 0.0737 | 0.0702 |
|  | 0.0050 | 0.0026 | −0.0004 | 0.0021 | 0.0110 | 0.0125 | 0.0159 | 0.0147 | 0.0189 | 0.0490 | 0.0727 | 0.0922 |
| Contrast Ratings (Avg) | 0.0081 | 0.0026 | 0.0055 | 0.0024 | 0.0116 | 0.0145 | 0.0158 | 0.0138 | 0.0126 | 0.0347 | 0.0728 | 0.0830 |
| Contrast Ratings (Stan Dev) | 0.0056 | 0.0009 | 0.0063 | 0.0016 | 0.0019 | 0.0034 | 0.0002 | 0.0018 | 0.0070 | 0.0188 | 0.0009 | 0.0115 |

Evaluation of Examples

Examples 1-5 demonstrate incompatible polymers from either the same or a different class, with similar refractive indices, can produce a textured surface that is made up of a uniform droplet type phase structure. Various solvents were used in the Examples to demonstrate versatility. Wide ranges of surface roughness were obtained.

Examples 6-18 (Table 6) demonstrate that the haze, clarity, and roughness can be adjusted over a wide range by manipulation of the blend of CA-398-6 and CAB 381-2, solvent selection, and dried thickness. All of the Examples had a uniform droplet type appearance. Similar responses were also obtained with examples 15-18. These Examples used CA 398-30 and CAB 381-20. These demonstrate that incompatible polymers with similar refractive indices can be used to obtain unique surface properties.

Examples 19-21 (Table 7) demonstrate that similar polymers can achieve a brightness gain. The best results were obtained when the two incompatible polymers were at equal levels which gave the maximum phase separation.

Examples 22-24 (Table 8) demonstrate that acceptable wet out properties can be achieved at low haze, low dry thickness, and on thin films (less than 40 μm) by adjusting the incompatible polymers and solvent selections.

Examples 25 and 26 (Table 9) demonstrate that by selecting polymers with similar refractive index very little bulk haze occurs. Bulk haze scatters light within the film resulting in a low amount of transmitted light.

Two-dimensional and three-dimensional images of several samples (FIGS. 3-6) were chosen to illustrate that the examples have a uniform droplet shape structure. Many combinations of polymers can create a rivulet type structure which creates undesirable light scatter and an optical defect called grain.

Examples 27-33 (Table 10) show that cohesion failure occurs below 35% CAB in a CA-CAB matrix.

Examples 34-36 (Table 11) show that this method can create about equal Haze-Clarity levels of 50%, 40%, and 30%.

Various embodiments of the invention have been described. These and other embodiments are within the scope of the following claims.

The invention claimed is:

1. An optical element comprising:
a light transmissive substrate; and
a continuous coating on the substrate, wherein the coating comprises:
a first region comprising a first polymer selected from cellulose resins and (meth)acrylic resins; and
a second region comprising a second polymer different from the first polymer, wherein the second polymer is selected from cellulose resins and (meth)acrylic resins;
wherein the first polymer and the second polymer are incompatible and non-reactive with one another, wherein the absolute value of the difference between the refractive index of the first polymer and the refractive index of the second polymer is from about 0 to about 0.01, wherein the first regions have a thickness different from the second regions, wherein the ratio by weight of the first polymer to the second polymer is from 1:2 to 10:1, and wherein the second regions project away from a surface of the substrate to a height of about 0.1 μm to about 15 μm above the height of the first regions.

2. The optical element of claim 1, wherein the first polymer and the second polymer comprise cellulose resins.

3. The optical element of claim 2, wherein the first polymer and the second polymer comprise one or more of cellulose acetate, cellulose acetate butyrate, and cellulose acetate propionate.

4. The optical element of claim 3, wherein the first polymer and the second polymer comprise one or more of cellulose acetate and cellulose acetate butyrate.

5. The optical element of claim 4, wherein at least 35% of the regions in the coating comprise cellulose acetate butyrate.

6. The optical element of claim 1, wherein the ratio of the first regions to the second regions in the coating is about 1:1.

7. The optical element of claim 1, wherein the coating has an RMS roughness of about 0.01 μm to about 2.0 μm.

8. The optical element of claim 1, wherein the bulk haze of the coating as measured after planarizing the substrate is less than about 1.0.

9. The optical element of claim 1, wherein the wherein the absolute value of the difference between the refractive index of the first polymer and the refractive index of the second polymer is about 0 to about 0.005.

10. The optical element of claim 1, wherein the coating has a haze of about 1% to about 99%.

11. The optical element of claim 1, wherein the coating has a clarity of about 5% to about 98%.

12. The optical element of claim 1, wherein the coating has a haze and a clarity both less than about 50%.

13. An optical element comprising:
a light transmissive substrate; and
a continuous coating on the substrate, wherein the coating comprises:
a first region comprising a first polymer selected from cellulose resins and (meth)acrylic resins; and
a second region comprising a second polymer different from the first polymer, wherein the second polymer is selected from cellulose resins and (meth)acrylic resins; and
a third polymer compatible with at least one of the first and the second polymers, wherein the first polymer and the second polymer are incompatible and non-reactive with one another, wherein the absolute value of the difference between the refractive index of the first polymer and the refractive index of the second polymer is from about 0 to about 0.01, and wherein the first regions have a thickness different from the second regions.

14. An optical element comprising:
a light transmissive substrate; and
a continuous coating on the substrate, wherein the coating comprises:
   a first region comprising a first polymer selected from cellulose resins and (meth)acrylic resins; and
   a second region comprising a second polymer different from the first polymer, wherein the second polymer is selected from cellulose resins and (meth)acrylic resins;
wherein the first polymer and the second polymer are incompatible and non-reactive with one another, wherein the absolute value of the difference between the refractive index of the first polymer and the refractive index of the second polymer is from about 0 to about 0.01, wherein the first regions have a thickness different from the second regions, wherein the ratio by weight of the first polymer to the second polymer is from 1:2 to 10:1, and wherein the effective transmission of the coating is at least 1.1.

* * * * *

UNITED STATES PATENT AND TRADEMARK OFFICE
CERTIFICATE OF CORRECTION

PATENT NO. : 12,111,485 B2
APPLICATION NO. : 17/332477
DATED : October 8, 2024
INVENTOR(S) : Thomas J. Ludemann Page 1 of 1

It is certified that error appears in the above-identified patent and that said Letters Patent is hereby corrected as shown below:

In the Claims

Column 24
Line 45, in Claim 9, delete "wherein the wherein the", and insert -- wherein the --; therefor.

Signed and Sealed this
Eighteenth Day of February, 2025

Coke Morgan Stewart
*Acting Director of the United States Patent and Trademark Office*